(12) United States Patent
Hsiao

(10) Patent No.: US 6,418,996 B1
(45) Date of Patent: Jul. 16, 2002

(54) LAMINATOR

(75) Inventor: Chin-Tsung Hsiao, Taipei Hsien (TW)

(73) Assignee: Tex Year Industries Incorporation, Taipei Hsien (TW)

( * ) Notice: Subject to any disclaimer, the term of this patent is extended or adjusted under 35 U.S.C. 154(b) by 65 days.

(21) Appl. No.: 09/630,801

(22) Filed: Aug. 2, 2000

(51) Int. Cl.$^7$ .............................................. B30B 15/34
(52) U.S. Cl. ...................... 156/555; 156/499; 156/582; 156/583.1; 100/327
(58) Field of Search ................................. 156/555, 580, 156/582, 583.1, 499; 100/327, 328, 160, 176

(56) References Cited

U.S. PATENT DOCUMENTS

| | | | | |
|---|---|---|---|---|
| 3,901,758 A | * | 8/1975 | Humphries | 156/499 |
| 5,232,538 A | * | 8/1993 | Liu | 156/359 |
| 5,445,700 A | * | 8/1995 | Uang | 156/359 |
| 5,571,368 A | * | 11/1996 | Barge | 156/359 |
| 5,707,481 A | * | 1/1998 | Takeda et al. | 156/555 |
| 5,716,490 A | * | 2/1998 | Kuhns et al. | 156/499 |
| 5,728,257 A | * | 3/1998 | Lee | 156/555 |
| 5,746,878 A | * | 5/1998 | Kuhns et al. | 156/364 |

* cited by examiner

Primary Examiner—James Sells
(74) Attorney, Agent, or Firm—Rosenberg, Klein & Lee

(57) ABSTRACT

Laminator including: a pair of fixing seats fixedly mounted in a housing opposite to each other; a pair of pressing rollers parallelly pivotally installed between the pair of fixing seats, the rotary shafts at one end of the pressing rollers being respectively fitted in two gears which are drivingly engaged with each other, one of the gears being engaged with and driven by a driving gear of a driving motor; a thermally conductive casing assembly fixedly mounted between the fixing seats for rotatably containing therein the pair of pressing rollers, a rear end of the thermally conductive casing assembly being formed with an enlarged exit, a front end of the thermally conductive casing assembly being formed with a longitudinal entrance; and at least one heating member 4 fixed on the thermally conductive casing assembly for heating the same. Prior to passing through the pressing rollers, an article to be laminated is first heated by the thermally conductive casing assembly to a certain temperature. When the article passes through the pressing rollers and is released from the enlarged exit, the article contacts with external side by large area and thus is fast cooled.

1 Claim, 3 Drawing Sheets

LAMINATOR

BACKGROUND OF THE INVENTION

The present invention relates to an improved laminator which has simple structure and enables a laminated article to be quickly cooled.

A conventional domestic or personal laminator serves to laminate a photograph, a name card, a bookmark, etc. for keeping such articles permanently. However, the existent laminator has some shortcomings as follows:

1. The conventional laminator has complicated structure and is hard to assemble or maintain.
2. After heated and pressed by the internal pressing rollers, the laminated article is unable to immediately leave the heating range of the heating member. Therefore, the laminated article is cooled relatively slowly and it often takes place that the plastic films adhered to the photograph again separate therefrom or bubbles are produced between the photograph and the plastic films. This leads to poor quality of the laminated article.
3. In order to contain the complicated mechanical structure, the housing of the laminator has considerably large volume which occupies much room.

SUMMARY OF THE INVENTION

It is therefore a primary object of the present invention to provide an improved laminator including: a pair of fixing seats fixedly mounted in a housing opposite to each other; a pair of pressing rollers parallelly pivotally installed between the pair of fixing seats, the rotary shafts at one end of the pressing rollers being respectively fitted in two gears which are drivingly engaged with each other, one of the gears being engaged with and driven by a driving gear of a driving motor; a thermally conductive casing assembly fixedly mounted between the fixing seats for rotatably containing therein the pair of pressing rollers, a rear end of the thermally conductive casing assembly being formed with an enlarged exit, a front end of the thermally conductive casing assembly being formed with a longitudinal entrance; and at least one heating member 4 fixed on the thermally conductive casing assembly for heating the same. Prior to passing through the pressing rollers, an article to be laminated is first heated by the thermally conductive casing assembly to a certain temperature. When the article passes through the pressing rollers and is released from the enlarged exit, the article contacts with external side by large area and thus is fast cooled.

The present invention can be best understood through the following description and accompanying drawings wherein:

DETAILED DESCRIPTION OF THE PREFERRED EMBODIMENT

Figure 1:
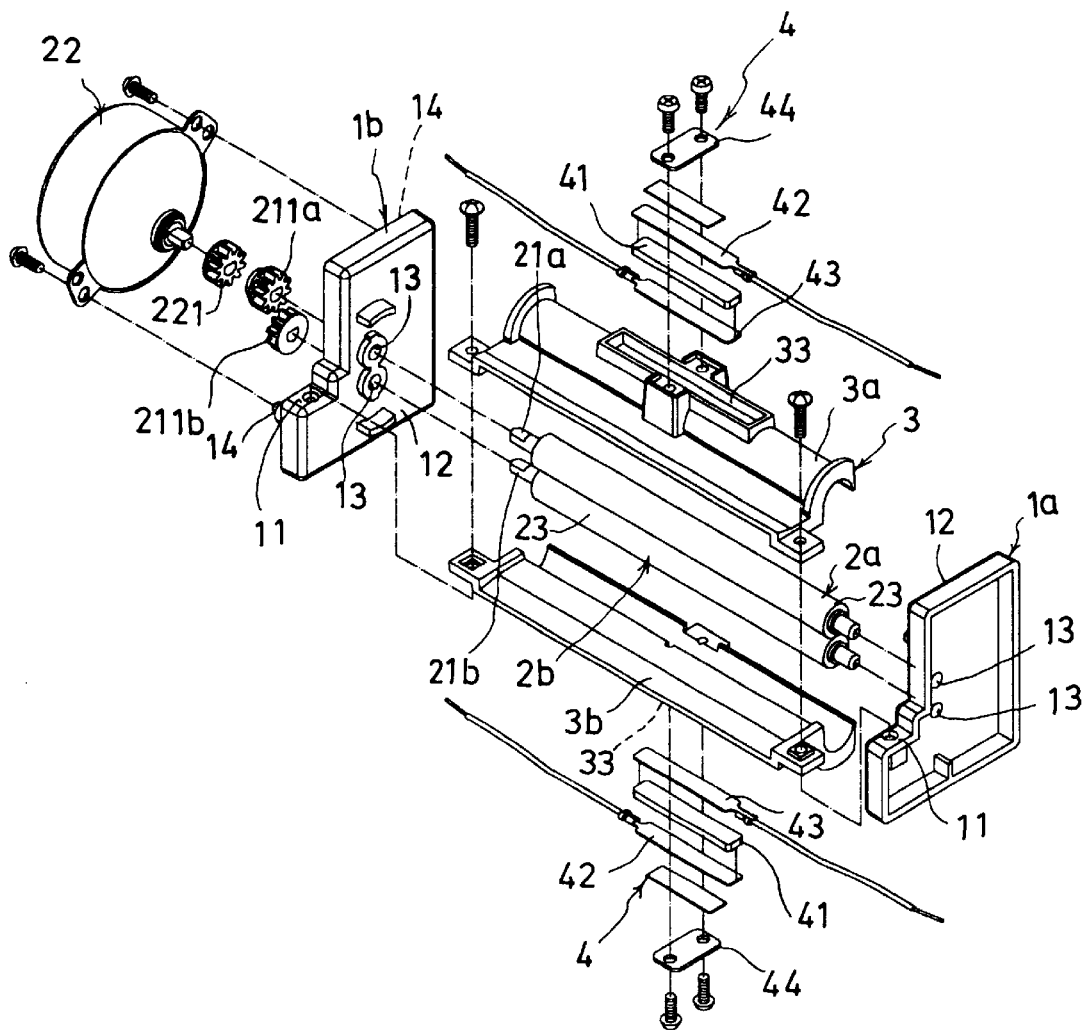
FIG. 1 is a perspective exploded view of the present invention.
Figure 2:
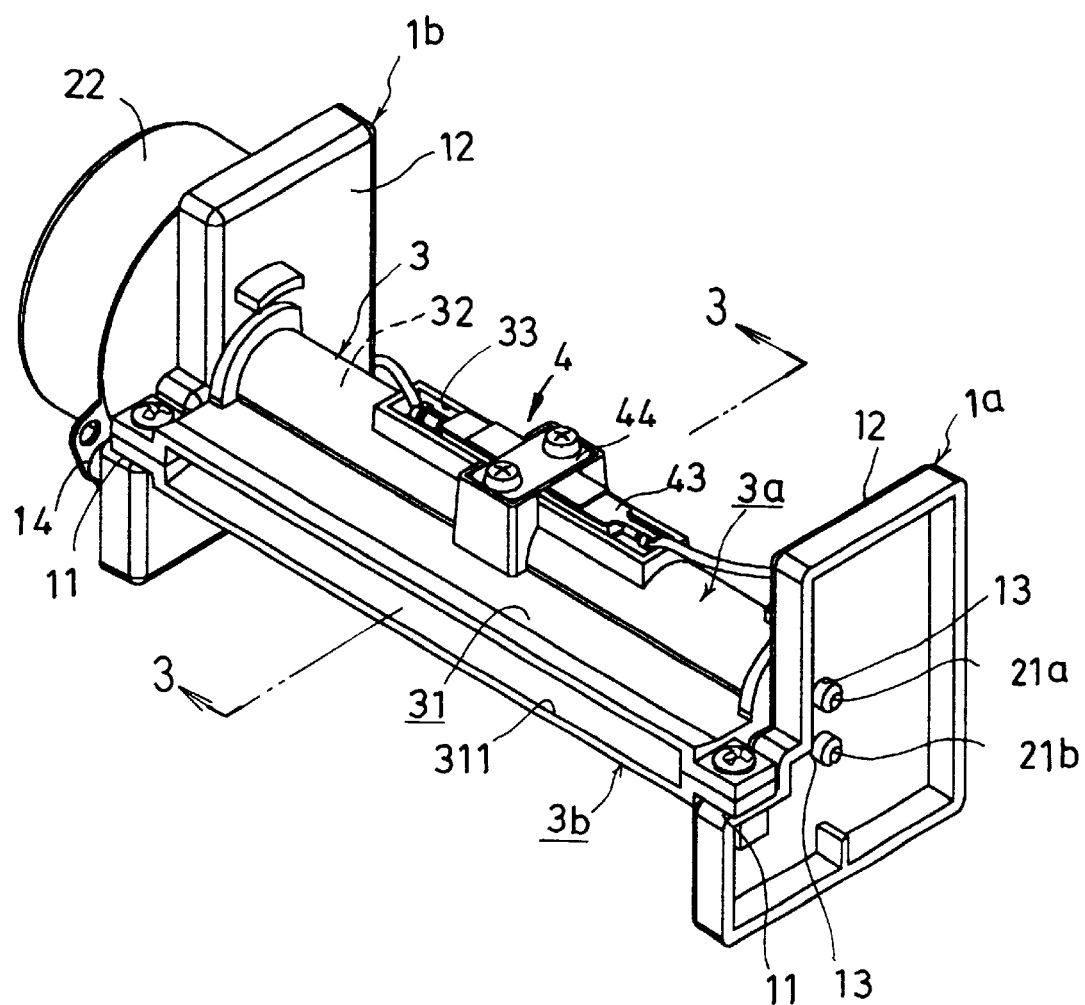
FIG. 2 is a perspective assembled view of the present invention.
Figure 3:
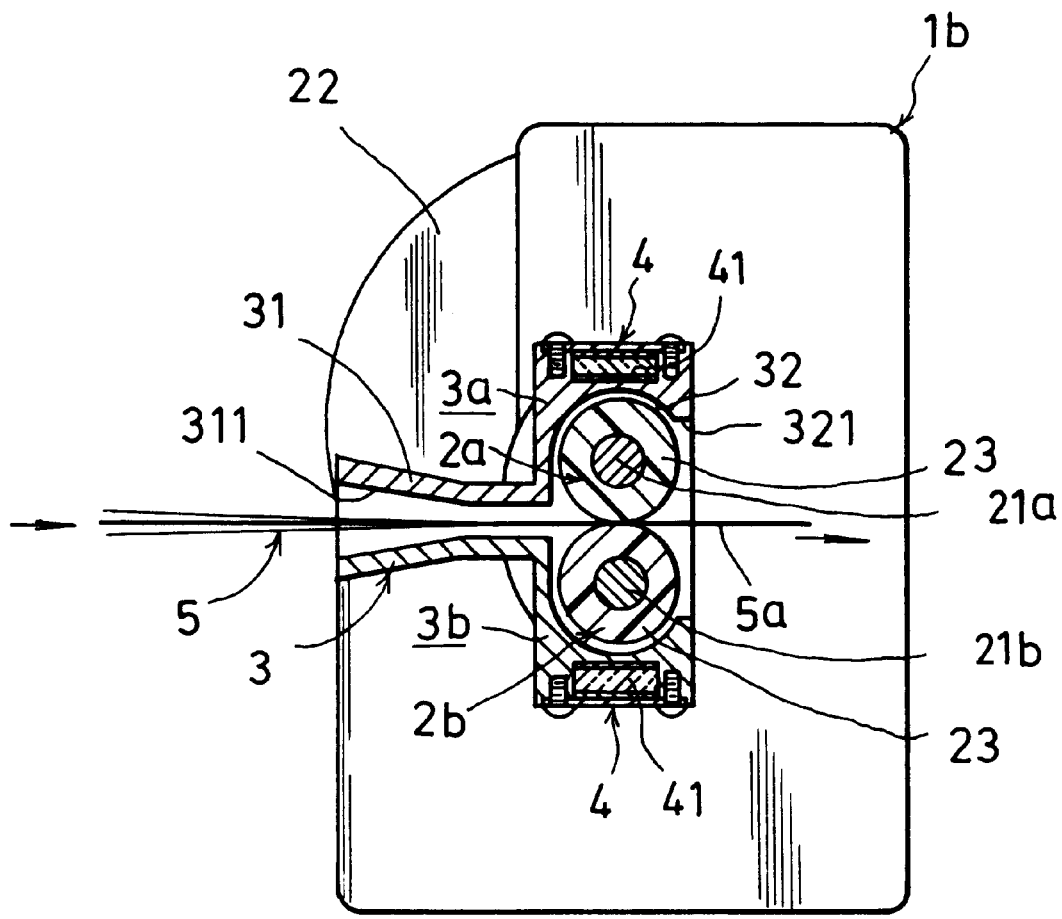
FIG. 3 is a sectional view taken along line 3—3 of FIG. 2.

Please refer to FIGS. 1, 2 and 3. The laminator of the present invention includes: a pair of fixing seats 1a, 1b fixedly mounted in a housing (not shown) of the laminator opposite to each other; a pair of pressing rollers 2a, 2b parallelly pivotally installed between the pair of fixing seats 1a, 1b, the rotary shafts 21a, 21b at one end of the pressing rollers 2a, 2b being respectively fitted in two gears 211a, 211b which are drivingly engaged with each other, one gear 211a being engaged with and driven by a driving gear 221 of a driving motor 22; a thermally conductive casing assembly 3 fixedly mounted between the fixing seats 1a, 1b for rotatably containing therein the pair of pressing rollers 2a, 2b, a rear end of the thermally conductive casing assembly 3 being formed with an enlarged exit 321, a front end of the thermally conductive casing assembly 3 being formed with a longitudinal entrance 311; and at least one heating member 4 fixed on the thermally conductive casing assembly 3 for heating the same. Prior to passing through the pressing rollers 2a, 2b, an article to be laminated is first heated by the thermally conductive casing assembly 3 to a certain temperature. When the article 5 passes through the pressing rollers 2a, 2b and is released from the enlarged exit 321, the article 5 contacts with external side by large area and thus is fast cooled.

A front end of each of the fixing seats 1a, 1b is formed with a rest section 11 on which two ends of the thermally conductive casing assembly 3 are locked. The panels 12 of the fixing seats 1a, 1b are formed with two pairs of opposite shaft holes 13 at which the two pressing rollers 2a, 2b are rotatably mounted. Two projecting posts 14 are disposed on outer side of one fixing seat 1b for locking the driving motor 22 therebetween.

Each of the pressing rollers 2a, 2b has a rotary shaft 21a, 21b and a layer of silicone 23 wrapped the outer circumference of the rotary shaft 21a, 21b. The pressing rollers 2a, 2b oppositely press the laminated article 5 and send out the laminated article 5 to rear side.

The thermally conductive casing assembly 3 is composed of an upper casing 3a and a lower casing 3b mated with each other. The front end of the thermally conductive casing assembly 3 is formed with a preheating section 31 extending forward from front end of the thermally conductive casing assembly 3. The front edge of the preheating section 31 is formed with an entrance 311 through which the laminated article 5 enters the preheating section 31 for preheating. A rear section of the thermally conductive casing assembly 3 is formed with a receptacle 32 for rotatably receiving therein at least the front sections of the pressing rollers 2a, 2b. The rear end of the receptacle 32 is formed with an enlarged exit 321.

The heating member 4 of the present invention includes a heater 41 (such as a PTC) sandwiched between two electrodes 42, 43 and locked in a fixing sink 33 of the thermally conductive casing assembly 3 by a press board 44. After the two electrodes 42, 43 are powered on, the heater 41 is heated to transfer the thermal energy to the thermally conductive casing assembly 3 and increase the temperature thereof.

As shown in FIG. 3, when laminated, the laminated article 5 is placed into the thermally conductive casing assembly 3 through the entrance 311 thereof. Thereafter, the laminated article 5 is heated to a certain temperature by the preheating section 31 of the thermally conductive casing assembly 3. Then the pair of pressing rollers 2a, 2b press the laminated article 5 to make the laminates adhered to each other and then send out the laminated article 5. The pressed and adhered laminated article 5a then passes through the enlarged-exit 321 of the thermally conductive casing assembly 3 and is no more enclosed by the thermally conductive casing assembly 3. The laminated article 5a then contacts with the external cold air by large area to be fast cooled. Therefore, the adhered laminates of the laminated article 5 are prevented from separating from each other again.

The laminator of the present invention is composed of two fixing seats 1a, 1b, two pressing rollers 2a, 2b, a thermally conductive casing assembly 3 and a heating member 4 and has simple structure. The components can be easily and quickly assembled. The rear end of the thermally conductive casing assembly 3 is formed with an enlarged exit 321 so that the laminated article can be quickly cooled to ensure quality of the laminated article.

The above embodiment is only used to illustrate the present invention, not intended to limit the scope thereof. Many modifications of the above embodiment can be made without departing from the spirit of the present invention.

What is claimed is:

1. A laminator comprising:

a pair of fixing seats fixedly secured to opposite ends of a housing, a front end of each of said fixing seats being formed with a rest section on which two ends of a thermally conductive casing assembly are locked, a pair of panels of said fixing seats being formed with two pairs of opposite shaft holes through which a pair of pressing rollers are rotatably mounted, said pair of pressing rollers being pivotally mounted between said pair of fixing seats and being positioned parallel each to the other, each pressing roller having a rotary shaft formed at one end, each said rotary shaft being respectively fitted into one of a pair of gears, each of said gears engaging one another, one of said gears being engaged with and driven by a driving gear of said driving motor, each of said pressing rollers having a central rotational axis, said central rotational axes being spaced apart by a first vertical distance, two projecting posts being disposed on an outer side of one of said fixing seats for locking a driving motor therebetween;

a thermally conductive casing assembly fixedly mounted between said pair of fixing seats for rotatably receiving therein said pair of pressing rollers, said thermally conductive casing assembly having an upper casing and a lower casing mated each to the other, a front end of said thermally conductive casing assembly being formed with a preheating section extending forward from said front end of said thermally conductive casing assembly, a front edge of said preheating section being formed with a longitudinal entrance through which a laminated article enters said preheating section for preheating, said longitudinal entrance defining an entry area, said entry area gradually decreasing in the direction of movement of said laminated article, whereby the temperature of said laminated article is gradually increased, a rear section of said thermally conductive casing assembly being formed with a receptacle for rotatably receiving therein at least a pair of front sections of said pressing rollers, a rear end of said receptacle being formed with an enlarged exit, said enlarged exit being defined by a pair of rear edges, said pair of rear edges being spaced apart from one another by a second vertical distance, said second vertical distance being greater than said first vertical distance in order to increase a rate of convective cooling of said laminated article; and, at least one heating member fixedly secured to said thermally conductive casing assembly for heating said thermally conductive casing assembly, whereby prior to passing through said pressing rollers, said laminated article is preheated by said preheating section of said thermally conductive casing assembly, said laminated article then passing through said pressing rollers and being pressed therebetween, thereafter said laminated article being released from said enlarged exit of said thermally conductive casing assembly in order to be convectively cooled.

* * * * *